United States Patent [19]

Cason, III et al.

[11] 3,793,579
[45] Feb. 19, 1974

[54] AUTOIONIZATION SPECTROMETER

[75] Inventors: Charles M. Cason, III; James F. Perkins, both of Huntsville, Ala.

[73] Assignee: The United States of America as represented by the Secretary of the Army, Washington, D.C.

[22] Filed: June 2, 1972

[21] Appl. No.: 259,187

[52] U.S. Cl. .................... 331/94.5, 356/74, 356/98
[51] Int. Cl. ............................................. H01s 3/22
[58] Field of Search ..................... 331/94.5; 356/74

[56] References Cited
OTHER PUBLICATIONS

Freiberg et al., J. Applied Physics, 38, (1), Jan. 1967, pp. 250–262.
Bletzinger et al., Proc. IEEE, 59, (4), April, 1971, pp. 675–679.
Peter, Physics Letters, Vol. 25A, No. 2, 31 July, 1967, pp. 171–175.

*Primary Examiner*—Ronald L. Wibert
*Assistant Examiner*—R. J. Webster
*Attorney, Agent, or Firm*—Edward J. Kelly; Herbert Berl; Jack W. Voigt

[57] ABSTRACT

A spectrometer is provided for directly obtaining the autoionization energy levels within a gas laser and for observing decay probabilities to lower stable energy levels. A laser cavity is periodically interrupted by a rotating chopper wheel. Simultaneously, a probe within the laser plasma is continuously scanned across a ramp potential for attracting or repelling electrons in the plasma ground state. The laser energy in the autoionization state which varies with the chopper wheel rate is sensed by the probe circuit, isolated, amplified, and ultimately recorded as a scalar function of the modulation voltage input. Thus, the population density of the autoionization energy levels for various laser energy levels is obtainable across the frequency range of the chopper wheel.

2 Claims, 1 Drawing Figure

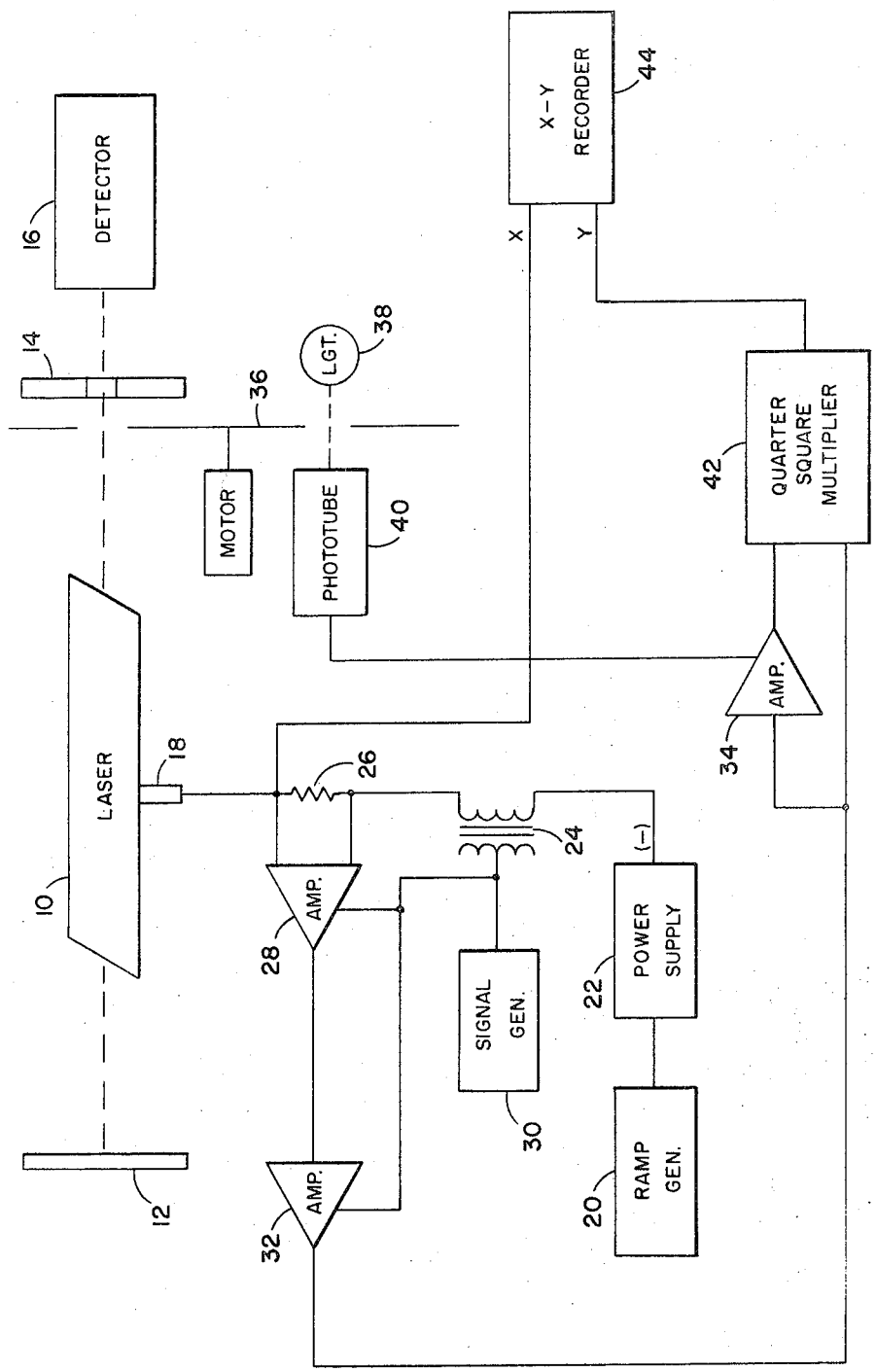

AUTOIONIZATION SPECTROMETER

SUMMARY OF THE INVENTION

The present invention is an apparatus and method for directly measuring the autoionization energy levels of a laser. A power supply provides a periodic ramp voltage output which is modulated by a high frequency and coupled to a Langmuir probe within the laser plasma. Depletion of electrons within the velocity distribution excites autoionization energy levels. By modulating the ground state of the molecules in a gas laser, the electrons in the vicinity of auto-ionizing energies are modulated. This change in electron density, which is made easily detected by use of a chopper wheel, is sensed by the probe circuitry. The variation in electron density observed at discrete energies is directly proportional to the rate of the autoionization process.

An object of the present invention is to provide a spectrometer for directly measuring autoionization energy levels of a gas laser.

BRIEF DESCRIPTION OF THE DRAWING

The single FIGURE is a circuit diagram of a laser autoionization spectrometer with extraneous and auxiliary equipment omitted.

DESCRIPTION OF THE PREFERRED EMBODIMENT

The autoionization spectrometer allows a direct reading of autoionization energy levels in a laser as a data output of the spectrometer. Decay probabilities of the energy levels to lower, stable energy levels may be observed from the output data. The method for measuring these energy levels analyzes the depletion of electrons within the velocity distribution function which excites the autoionization energy levels. The electrons within the distribution function are scanned by a slowly varying, retarding energy scan. This electron depletion is small but is made prominent by modulating the depletion density and using a low noise, high gain, synchronous amplifier to extract the signal. During lasing action, the laser ground state molecular density is increased. The electron population is modulated by modulating the ground state density of the molecules. A Langmuir probe is used as the detector.

In the single Figure a tube 10 represents a $CO_2$—$N_2$—He laser having a fully reflective mirror 12 and a partially reflective mirror 14 coaxially aligned therewith for forming a laser cavity. A power detector and meter 16 is coaxial with and adjacent to partially reflective mirror 14 for observing operation of the laser. A Langmuir probe 18 projects through the laser wall, having a very small tungsten wire (not shown) along the axis of the discharge tube. Probe 18 can be remotely positioned in the plasma discharge for providing a maximum signal consistent with local laser oscillations. The probe is driven by a voltage ramp from a low impedance source, such as a ramp generator 20 feeding a programable power supply 22, power supply 22 being connected through the secondary of a transformer 24 and a dropping resistor 26 to the input of probe 18. The dropping resistor is also connected across the input of an isolation amplifier 28 and allows the probe current signal to be coupled to the amplifier. Variation of electron density within the laser is developed across the dropping resistor and sensed by amplifier 28. Amplifier 28 prevents following circuitry signals from interfering with the probe circuit. A signal generator 30 is connected to the primary of transformer 24 for coupling a sine wave having very low harmonic content through the transformer and into probe 18. A narrow band amplifier 32 is responsive to an output of isolation amplifier 28 for amplifying the detected variation in electron density. The sinusoidal output signal from generator 30 is also coupled to amplifier 28 and amplifier 32. The velocity distribution function for the electrons within the plasma is obtained from established methods which use the second harmonic of the signal generated in the probe circuit by the plasma. The harmonic signal is detected by isolation amplifier 28 and fed to narrow band amplifier 32 which is tuned to the second harmonic of the signal generator. This harmonic signal is proportional to the change in the electrons per cubic centimeter per unit energy. A graph of the second harmonic signal as a function of retarding energy gives the familiar speed distribution function.

The output signal of amplifier 32 is fed to the input of a narrow band, phase lock amplifier 34. A motor driven chopper wheel 36 adjacent the output laser mirror 14 rotates within the laser cavity for periodically gain spoiling lasing. A light source 38 and phototube 40 are mounted diametrically opposite the laser cavity with respect to wheel 36 such that rotation of the wheel will interrupt a light beam from source 38 simultaneously with the interruption of the laser beam. Phototube 40 responds to the periodically interrupted light beam to provide an output signal to phase lock amplifier 34. Thus, amplifier 34 receives a reference signal from phototube circuit 40 and is thereby tuned to the chopping wheel frequency. When lasing action is periodically interrupted within the optical cavity the $N_2$ ground state density is modulated at the interruption rate. The narrow band amplifier 32 also has an output coupled into a quarter-square multiplier 42, which is adjusted to the divide mode for automatic scaling. Phase lock amplifier 34 has the output coupled to multiplier 42, the output of amplifier 34 being the numerator and the output of amplifier 32 being the denominator for the multiplier divide mode. The output signal of phase lock amplifier 34 is proportional to the free electrons modulated at the autoionization energy and referenced to the chopper wheel frequency.

When an energy level exists which is excited by electrons in the distribution at the particular energy point along the voltage sweep, electron population density will be modulated and generate a signal. The resulting output of quarter-square multiplier 42 is the normalized change in electron density at the particular electron retarding energy of the scan. This signal is proportional to the excitation collision rate. The output signal of quarter-square multiplier 42 is the linearized autoionization rate for the molecules. This rate signal is coupled as the y input of an x-y recorder 44. The x input of recorder 44 is the electron retarding energy and is referenced to the voltage level present in the discharge seen by probe 18.

The process is activated by modulating the ground state laser molecules by means of a chopper wheel laser. Ground state laser molecules may be analyzed for autoionization energy levels. The source excitation electrons which excite the autoionization energy levels by impact will also have a modulation in their density at the autoionization energy level excited. The relative amplitude of these peaks then is linearly proportional to the relative cross section for excitation when scaled by multiplier 42. The multiplier 42 output signal, proportional to the excitation collision cross section, will have several peaks. For exaple, with $N_2$ a vibrational resonance peak will lie approximately 2300 wave numbers lower in energy from its autoionizational peak. This first resonance peak is proportional to the number which will decay into the $v = 1$ level. The next lower lying resonance peak is spaced two times this energy multiple and will apply to the $v = 2$ level, succeeding lower lying resonance peaks will have the same spacing multiple.

In operation, the laser chopper wheel rate has a direct effect on observing the autoionization energy level. Increasing the lasing period reduces the population density for a given laser excitation level. The power supply introduces a negative potential on the Langmuir probe and the ramp generator for the electron retarding energy allows the potential to be scanned back and forth across a small voltage range modulated by the signal generator output. The state of laser excitation and ionization of the gases results in only the more active electrons being captured by the probe. Changes in the electron density captured by the probe at a particular electron retarding energy is indicative of the autoionization rate. The isolation amplifier and narrow band amplifier, tuned to the second harmonic frequency of the signal generator respond to and amplify second harmonic signals of the electron density from the cavity, which are sensed across the dropping resistor. The chopper wheel rate superimposed on the harmonic output is phase locked (synchronized) to the reference frequency from hte phototube. This reference frequency is removed by the quarter-square multiplier leaving only the scalar population density pulses which are indicative of the autoionization energy levels in the laser ground state at specific laser excitation levels.

Although a preferred embodiment of the invention has been described, it will be obvious to those skilled in the art that various changes and modifications may be made without departing from the true spirit and scope of this invention. For example, other molecules known to exhibit autoionization levels and be coupled to lasing action are CO and $CO_2$. Accordingly, it is understood that the invention is to be limited only by the claims appended hereto.

We claim:

1. An autoionization spectrometer for measuring the depletion of electrons within the velocity distribution function which excites autoionization energy levels of a laser comprising: a gas laser having a resonant cavity for generating pulses of laser energy, a Langmuir probe coupled to said laser cavity for providing an output signal in response to ground state electron density within said cavity, a motor driven chopper wheel disposed for rotation within said laser cavity for intermittently interrupting lasing action thereof and thereby forming a variable output pulse repetition rate, an isolation amplifier having input terminals and an output, a resistance connected across said input terminals of said isolation amplifier, a ramp generator for providing a ramp voltage output, a transformer having the secondary coupled between said ramp generator and one side of said resistor, the other side of said resistor being connected to said probe for coupling said ramp voltage to said probe and for coupling probe output signals across the input of said isolation amplifier, a signal generator connected to the primary of said transformer for coupling a high frequency modulation level onto said ramp voltage, a narrow-band amplifier having an output and having an input coupled to the output of said isolation amplifier, phase sensitive means having first and second inputs and an output, said first input being coupled to the output of said narrow-band amplifier, a light source adjacent one side of said chopper wheel, a photo detector coaxial with said light source on the other side of said chopper wheel for receiving pulses of light energy simultaneously with output pulses of said laser, an output of said phototube being coupled to said second input of said phase sensitive means for coupling the chopper wheel pulse repetition rate thereto, and a recoder coupled to the output of said phase sensitive means for recording a graph of signals coupled thereto.

2. The apparatus as set forth in claim 1 and further comprising: a quarter-square multiplier having a first input coupled to the output of said narrow-band amplifier and a second input connected to the output of said phase sensitive means, an output of said multiplier being coupled as an autoionization population density input of said recorder, another input of said recorder being connected to said Langmuir probe and responsive to the total energy level thereon for recording a graph of autoionization population density versus energy.

* * * * *